US009039561B2

(12) United States Patent
Beck et al.

(10) Patent No.: US 9,039,561 B2
(45) Date of Patent: May 26, 2015

(54) MULTI-RATIO TRANSMISSION

(71) Applicant: ZF Friedrichshafen AG, Friedrichshafen (DE)

(72) Inventors: Stefan Beck, Eriskirch (DE); Timo Wehlen, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/376,624

(22) PCT Filed: Jan. 10, 2013

(86) PCT No.: PCT/EP2013/050345
§ 371 (c)(1),
(2) Date: Aug. 5, 2014

(87) PCT Pub. No.: WO2013/117368
PCT Pub. Date: Aug. 15, 2013

(65) Prior Publication Data
US 2015/0051043 A1    Feb. 19, 2015

(30) Foreign Application Priority Data
Feb. 6, 2012   (DE) .......................... 10 2012 201 685

(51) Int. Cl.
*F16H 3/66*    (2006.01)
*F16H 3/72*    (2006.01)
(Continued)

(52) U.S. Cl.
CPC . *F16H 3/66* (2013.01); *B60K 6/365* (2013.01); *B60K 6/48* (2013.01); *F16H 3/725* (2013.01);
(Continued)

(58) Field of Classification Search
CPC ........... F16H 3/66; F16H 3/725; F16H 37/04; F16H 37/042; F16H 2003/442; F16H 2200/0008; F16H 2200/006; F16H 2200/201; F16H 2200/2043; Y02T 10/6221; Y02T 10/6252; B60K 2006/4825; B60K 6/365; B60K 6/48
See application file for complete search history.

(56) References Cited

U.S. PATENT DOCUMENTS

| 4,395,925 A | 8/1983 | Gaus |
| 6,572,507 B1 | 6/2003 | Korkmaz et al. |

(Continued)

FOREIGN PATENT DOCUMENTS

| DE | 29 36 969 A1 | 4/1981 |
| DE | 199 12 480 A1 | 9/2000 |

(Continued)

OTHER PUBLICATIONS

German Search Report Corresponding to 10 2012 201 686.4 mailed Aug. 9, 2013 6 pages.

(Continued)

*Primary Examiner* — Justin Holmes
(74) *Attorney, Agent, or Firm* — Davis & Bujold, P.L.L.C.; Michael J. Bujold

(57) ABSTRACT

A multi-stage transmission with eight forward and one reverse gear, including drive and output shafts, planetary gearsets, gear stage, shift elements and shafts. The drive shaft couples the carrier of gearset (P1) and can couple shaft (5) via clutch (15). Shaft (5) couples the ring and sun gears of respective gearsets (P2, P3). The ring gear of gearset (P1) couples shaft (6), which couples the sun gear of gearset (P2). Shaft (3) couples the sun gear of gearset (P1) and the ring gear of gearset (P3) and can couple the housing via brake (03). The carrier of gearset (P2) couples shaft (4), which can couple the output shaft via gear stage (S1) and clutch (24). The carrier of gearset (P3) couples shaft (7), which can couple the output shaft via gear stage (S2) and clutch (27), and clutch (46, 56, 45) engages to block gearset (P2).

20 Claims, 16 Drawing Sheets

(51) Int. Cl.
   *F16H 37/04* (2006.01)
   *B60K 6/365* (2007.10)
   *B60K 6/48* (2007.10)
   *F16H 3/44* (2006.01)

(52) U.S. Cl.
   CPC .......... *F16H 37/04* (2013.01); *F16H 2200/006* (2013.01); *F16H 2200/201* (2013.01); *F16H 2200/2043* (2013.01); *B60K 2006/4825* (2013.01); *Y02T 10/6221* (2013.01); *Y02T 10/6252* (2013.01); *F16H 2003/442* (2013.01); *F16H 2200/0008* (2013.01); *F16H 37/042* (2013.01)

(56) References Cited

U.S. PATENT DOCUMENTS

| | | | |
|---|---|---|---|
| 7,081,060 B2 * | 7/2006 | Hata et al. ........................ | 475/5 |
| 7,549,942 B2 | 6/2009 | Gumpoltsberger | |
| 7,699,743 B2 | 4/2010 | Diosi et al. | |
| 8,210,981 B2 | 7/2012 | Bauknecht et al. | |
| 2008/0090697 A1 | 4/2008 | Ortmann et al. | |
| 2008/0242492 A1 | 10/2008 | Phillips et al. | |
| 2009/0305837 A1 | 12/2009 | Hiraiwa | |
| 2010/0035718 A1 | 2/2010 | Saitoh | |
| 2010/0069191 A1 | 3/2010 | Swales et al. | |
| 2010/0210399 A1 | 8/2010 | Wittkopp et al. | |

FOREIGN PATENT DOCUMENTS

| | | | |
|---|---|---|---|
| DE | 10 2004 023 949 A1 | 12/2005 | |
| DE | 10 2004 038 516 A1 | 2/2006 | |
| DE | 10 2005 010 210 A1 | 9/2006 | |
| DE | 10 2006 001 746 A1 | 8/2007 | |
| DE | 10 2006 001 760 A1 | 8/2007 | |
| DE | 10 2006 006 637 A1 | 9/2007 | |
| DE | 10 2008 051 177 A1 | 8/2009 | |
| DE | 10 2008 000 428 A1 | 9/2009 | |
| DE | 10 2009 009 300 A1 | 9/2009 | |
| DE | 10 2009 018 958 A1 | 2/2011 | |
| DE | 10 2009 047 265 A1 | 6/2011 | |
| JP | 2009-270667 A | 11/2009 | |

OTHER PUBLICATIONS

German Search Report Corresponding to 10 2012 201 687.2 mailed Aug. 9, 2013 6 pages.
German Search Report Corresponding to 10 2012 201 690.2 mailed Aug. 12, 2013 6 pages.
German Search Report Corresponding to 10 2012 201 689.9 mailed Aug. 12, 2013 6 pages.
German Search Report Corresponding to 10 2012 201 692.9 mailed Aug. 6, 2013 6 pages.
German Search Report Corresponding to 10 2012 201 685.6 mailed Aug. 7, 2013 6 pages.
German Search Report Corresponding to 10 2012 201 684.8 mailed Aug. 22, 2013 6 pages.
German Search Report Corresponding to 10 2012 201 678.3 mailed Aug. 22, 2013 6 pages.
German Search Report Corresponding to 10 2012 201 682.1 mailed Aug. 22, 2013 6 pages.
German Search Report Corresponding to 10 2012 201 681.3 mailed Aug. 22, 2013 6 pages.
International Search Report Corresponding to PCT/EP2013/050337 mailed Mar. 22, 2013 8 pages.
International Search Report Corresponding to PCT/EP2013/050338 mailed Mar. 22, 2013 8 pages.
International Search Report Corresponding to PCT/EP2013/050340 mailed Mar. 22, 2013 8 pages.
International Search Report Corresponding to PCT/EP2013/050341 mailed Mar. 22, 2013 8 pages.
International Search Report Corresponding to PCT/EP2013/050344 mailed Mar. 22, 2013 8 pages.
International Search Report Corresponding to PCT/EP2013/050345 mailed Mar. 22, 2013 8 pages.
International Search Report Corresponding to PCT/EP2013/050347 mailed Mar. 27, 2013 6 pages.
International Search Report Corresponding to PCT/EP2013/050349 mailed Mar. 27, 2013 6 pages.
International Search Report Corresponding to PCT/EP2013/050350 mailed Mar. 27, 2013 6 pages.
International Search Report Corresponding to PCT/EP2013/050782 mailed Feb. 27, 2013 5 pages.
Written Opinion Corresponding to PCT/EP2013/050337 mailed Mar. 22, 2013 7 pages.

* cited by examiner

| GEAR | ENGAGED SHIFT ELEMENTS | | | | | TRANS. RATIO | GEAR STEP |
|---|---|---|---|---|---|---|---|
| | BRAKE | CLUTCH | | | | | |
| | 03 | 46 | 15 | 24 | 27 | i | φ |
| 1 | ● | | ● | | ● | 5.084 | |
| 2 | ● | ● | | | ● | 3.214 | 1,582 |
| 3 | | ● | ● | | ● | 1.970 | 1,631 |
| 4 | | ● | | ● | ● | 1.582 | 1,245 |
| 5 | | | ● | ● | ● | 1.257 | 1,259 |
| 6 | | ● | ● | ● | | 1.000 | 1,257 |
| 7 | ● | | ● | ● | | 0.819 | 1,221 |
| 8 | ● | ● | | ● | | 0.632 | 1,296 |
| R | ● | | | ● | ● | −3.575 | 8.040 |

Fig. 13

MULTI-RATIO TRANSMISSION

This application is a National Stage completion of PCT/EP2013/050345 filed Jan. 10, 2013, which claims priority from German patent application serial no. 10 2012 201 685.6 filed Feb. 6, 2012.

FIELD OF THE INVENTION

The present invention relates to a multi-stage transmission, particularly an automatic transmission for a motor vehicle.

BACKGROUND OF THE INVENTION

Automatic transmissions, particularly for motor vehicles, comprise planetary gear sets according to the prior art that are engaged by means of friction or shift elements such as clutches and brakes and are typically connected to a startup element, such as a hydrodynamic torque converter or a hydraulic coupling, subject to a slip effect and optionally equipped with a lock-up clutch.

These types of automatic transmissions are described often in the prior art and subject to continuous further development and improvement. Thus, these transmissions have a sufficient number of forward gears as well as at least one reverse gear and a gear ratio that is very well-suited for motor vehicles with a very high overall spread as well as favorable progressive ratios. Furthermore, the transmissions should enable a high starting ratio in the forward direction and contain a direct drive. In addition, automatic transmissions should require less construction costs and a small number of shift elements, in which, with the sequential shifting method, only one shift element should be engaged and one shift element should be disengaged.

An automatic transmission of this type is known to the applicant from DE 199 12 480 B4, for example. It comprises three carrier planetary gear sets as well as three brakes and two clutches for engaging six forward gears and one reverse gear, one drive shaft and one output shaft, in which the carrier of the first planetary gear set is permanently connected to the ring gear of the second planetary gear set and the carrier of the second planetary gear set is permanently connected to the ring gear of the third planetary gear set and the drive shaft is directly connected to the sun gear of the second planetary gear set.

Furthermore, with the known transmission, it is provided that the drive shaft can be connected to the sun gear of the first planetary gear set via the first clutch and can be connected to the carrier of the first planetary gear set via the second clutch, in which the sun gear of the first planetary gear set can be connected to a housing of the transmission via the first brake and the carrier of the first planetary gear set can be connected to the housing of the transmission via the second brake, in which the sun gear of the third planetary gear set can be connected to the housing of the transmission via the third brake. The output shaft of the transmission is permanently connected to the carrier of the third planetary gear set and the ring gear of the first planetary gear set.

SUMMARY OF THE INVENTION

The object of the present invention is to provide a multi-gear transmission, which has a small installation space requirement when viewed axially, which means that installation of the transmission and optional hybridization of the transmission is enabled as a front transverse system. In addition, the level of efficiency should be improved with respect to drag and gearing losses.

According to the invention, this object is achieved by the features described below.

Accordingly, a multi-stage transmission is proposed having an input and output, which are arranged in a housing. Furthermore, the transmission comprises three planetary gear sets; designated in the following as the first, second, and third planetary gear set; at least seven rotatable shafts, designated in the following as the drive shaft, output shaft, third, fourth, fifth, sixth, and seventh shaft; a first and a second spur gear stage in connection with a counter-shaft, which is arranged parallel to the longitudinal axis of the planetary gear sets and which serves as the output shaft of the transmission; and five shift elements comprising one brake and clutches the selective engagement of which effects various transmission ratios between the drive shaft and the output shaft, which means that preferably eight forward gears and one reverse gear can be implemented.

The planetary gear sets are preferably implemented as minus planetary gear sets. As is well known, a simple minus planetary gear set comprises a sun gear, a ring gear, and a carrier on which the planetary gears are rotatably supported, with the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear, and a carrier, on which inner and outer planetary gears are rotatably supported, wherein all inner planetary gears mesh with the sun gear and all outer planetary gears mesh with the ring gear, and each inner planetary gear meshes with only one outer planetary gear. As a result, when the carrier is fixed, the ring gear has the same direction of rotation as the sun gear, and this results in a positive stationary transmission ratio.

Furthermore, preferably two of the planetary gear sets of the transmission are arranged above another, when viewed radially, the result being that a very short overall length is achieved, whereby the transmission can be installed in passenger vehicles in the front transverse design.

In an advantageous manner, the second planetary gear set is disposed above the first planetary gear set, when viewed radially, in which the planetary gear sets are arranged, when viewed axially, in the sequence of first planetary gear set/second planetary gear set, third planetary gear set. Within the scope of additional embodiments of the invention, the axial sequence of the planetary gear sets can be in any form; in addition, the planetary gear sets can be arranged behind one another, when viewed axially.

According to the invention, the drive shaft is connected to the carrier of the first planetary gear set and can be detachably connected via a first clutch to the fifth shaft which is connected to the ring gear of the second planetary gear set and the sun gear of the third planetary gear set, in which the ring gear of the first planetary gear set is connected to the sixth shaft, which is connected to the sun gear of the second planetary gear set.

Furthermore, the carrier of the second planetary gear set is connected to the fourth shaft, which is detachably connected to the output shaft via the first spur gear stage and a second clutch. In doing so, the fourth shaft may be connected to a first spur gear of the first spur gear stage, the second spur gear of which may be detachably connected to the output shaft via the second clutch. Alternatively to this, the fourth shaft may be detachably connected to the first spur gear of the first spur gear stage via the second clutch, in which the second spur gear of the first spur gear stage is connected to the output shaft.

Instead of, or in addition to, the first spur gear stage, the fourth shaft may be detachably connected to the output shaft via at least one clutch by means of a chain, a belt, or one or more other type of component.

Furthermore, the carrier of the third planetary gear set is connected to the seventh shaft, which may be detachably connected to the output shaft via the second spur gear stage and a third clutch. In doing so, the seventh shaft may be connected to a first spur gear of the second spur gear stage, the second spur gear of which may be detachably connected to the output shaft via the third clutch. Within the scope of an additional embodiment, the seventh shaft may be detachably connected to the first spur gear of the second spur gear stage via the third clutch, in which the second spur gear of the second spur gear stage is connected to the output shaft.

Instead of, or in addition to, the second spur gear stage, the fourth shaft may be detachably connected to the output shaft via at least one clutch by means of a chain, a belt, or one or more other type of component.

The third shaft of the transmission is connected to the sun gear of the first planetary gear set and the ring gear of the third planetary gear set and can be coupled to the housing of the transmission via the brake.

According to the invention, a further clutch is provided, the engagement of which can block the second planetary gear set.

According to a first embodiment of the invention, the additional clutch is designed as a clutch that detachably connects the sixth shaft to the fourth shaft so that the blocking of the second planetary gear set can occur through a coupling of the sun gear of the second planetary gear set with the carrier of the second planetary gear set.

Within the scope of another embodiment of the invention, the additional clutch may be designed as a clutch that detachably connects the sixth shaft to the fifth shaft so that the blocking of the second planetary gear set can occur through a coupling of the ring gear of the second planetary gear set with the sun gear of the second planetary gear set.

Furthermore, the additional clutch may be designed as a clutch that detachably connects the fifth shaft to the fourth shaft so that the blocking of the second planetary gear set can occur through a coupling of the carrier of the second planetary gear set with the ring gear of the second planetary gear set.

The design, according to the invention, of the multi-stage transmission results in suitable transmission ratios, particularly for passenger vehicles, as well as an increased total overall spread in the multi-stage transmission, thereby resulting in an improvement in the driving comfort and a significant reduction in fuel consumption.

Furthermore, the multi-stage transmission according to the invention significantly reduces construction costs due to the lower number of shift elements. In an advantageous manner, the multi-stage transmission according to the invention makes it possible to implement startup with a hydrodynamic converter, an external startup clutch, or even with other suitable external startup elements. It is also conceivable to implement a startup process with a startup element integrated in the transmission. Preferably, a shift element that is actuated in the first forward gear and in the reverse gear is suitable.

Furthermore, the multi-stage transmission according to the invention results in a good level of efficiency in the main travel gears with respect to drag and gearing losses.

In addition, there are lower torques in the shift elements and in the planetary gear sets in the multi-stage transmission, whereby the wear is reduced in an advantageous manner. Furthermore, the lower torques enable a correspondingly small size, whereby the necessary installation space and corresponding costs are reduced. In addition, there are lower rotational speeds at the shafts, the shift elements, and the planetary gear sets.

Moreover, the transmission according to the invention is designed such that the installation space needs are less, when viewed axially, thereby enabling hybridization of the transmission as a front transverse system.

The output shaft is preferably connected to a differential, which distributes the torque to the drive wheels. A planetary gear set may be disposed between the input shaft of the differential and the output shaft. This can increase the transmission ratio from the output axle to the output axle of the differential, whereby the transmission ratio of the previously mentioned spur gear stages and/or mechanical components may be designed smaller, which means that construction advantages such as smaller wheelbases or smaller tooth face widths can be used.

BRIEF DESCRIPTION OF THE DRAWINGS

The invention is explained in greater detail in the following by means of the attached figures and examples. In the following:

FIG. 13: shows an example gearshift pattern for a multi-stage transmission according to FIGS. 1 through 12;

DETAILED DESCRIPTION OF THE PREFERRED EMBODIMENTS

Figure 1:
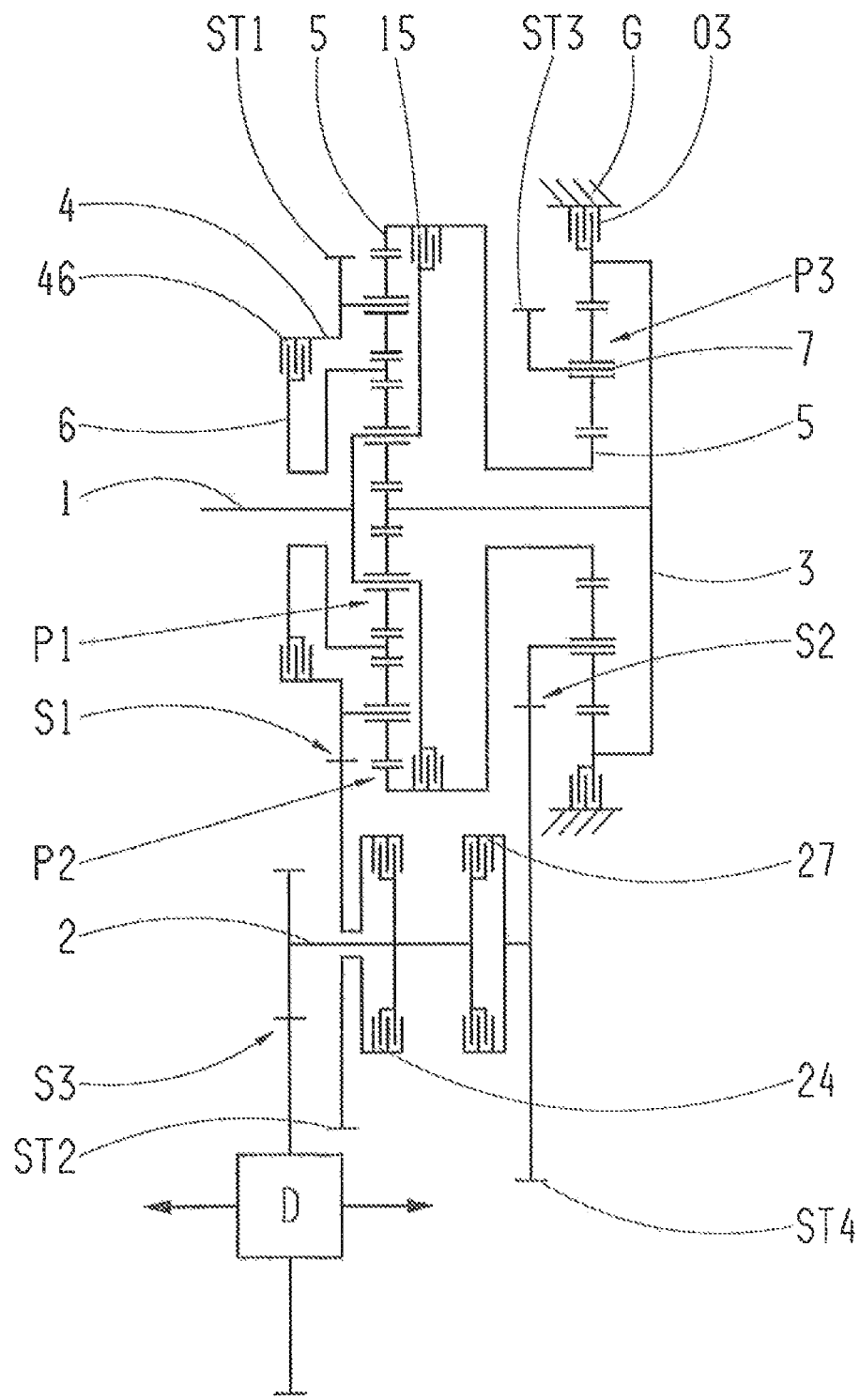
FIG. 1: shows a schematic view of a preferred embodiment of a multi-stage transmission according to the invention.

FIG. 1 shows a multi-stage transmission according to the invention having a first planetary gear set P1, a second planetary gear set P2, and a third planetary gear set P3, a first spur gear stage S1 and a second spur gear stage S2 in connection with a counter-shaft arranged parallel to the longitudinal axis of planetary gear sets P1, P2, P3 arranged coaxially with respect to one another, with the counter-shaft serving as the output shaft 2 of the transmission, which are disposed in a housing G.

In the example shown, the second planetary gear set P2 is arranged above the first planetary gear set P1, when viewed radially, thereby reducing the overall length of the transmission in an advantageous manner. Planetary gear sets P1, P2, P3 are arranged, when viewed axially, in the sequence of first planetary gear set P1/second planetary gear set P2, third planetary gear set P3.

Here, at least one planetary gear set in the transmission can be implemented as a plus planetary gear set if the carrier and ring gear connection are exchanged and, simultaneously, the value of the stationary transmission ratio is increased by 1 in comparison to the embodiment as a minus planetary gear set.

As shown in FIG. 1, there are five shift elements, namely one brake 03 and four clutches 15, 24, 27, and 46. The spatial disposition of the shift elements can be arbitrary and is limited only by the dimensions of the outer design. The clutches and the brake of the transmission are preferably implemented as friction shift elements or lamellar shift elements.

These shift elements make it possible to selectively shift eight forward gears and one reverse gear. The multi-stage transmission according to the invention has a total of at least seven rotatable shafts, in which the drive shaft forms the first shaft 1 and the output shaft forms the second shaft 2 of the transmission.

According to the invention, with the multi-stage transmission according to FIG. 1, the drive shaft is connected to the carrier of the first planetary gear set P1 and can be detachably connected, via a first clutch 15, to the fifth shaft 5 which is connected to the ring gear of the second planetary gear set P2 and the sun gear of the third planetary gear set P3, in which the ring gear of the first planetary gear set P1 is connected to the sixth shaft 6, which is connected to the sun gear of the second planetary gear set P2. The third shaft 3 is connected to the sun gear of the first planetary gear set P1 and the ring gear of the third planetary gear set P3 and can be coupled to the housing G of the transmission via the brake 03.

As shown in FIG. 1 the carrier of the second planetary gear set P2 is connected to the fourth shaft 4, which is connected to a first spur gear ST1 of the first spur gear stage S1, the second spur gear ST2 of which can be detachably connected to the output shaft 2 via a second clutch 24, in which the carrier of the third planetary gear set P3 is connected to the seventh shaft 7, which is connected to a first spur gear ST3 of the second spur gear stage S2, and in which the second spur gear ST4 of the second spur gear stage S2 is detachably connected to the output shaft 2 via a third clutch 27.

In this case, the second and the third clutch 24, 27 are arranged coaxially with respect to the output shaft 2 and next to one another when viewed axially.

Furthermore, with the transmission according to the invention, an additional clutch is provided, the engagement of which can block the second planetary gear set P2. With the example shown in FIG. 1, the additional clutch is designed as a fourth clutch 46 that detachably connects the sixth shaft 6 to the fourth shaft 4 so that the blocking of the second planetary gear set P2 can occur through a coupling of the sun gear of the second planetary gear set P2 with the carrier of the second planetary gear set P2.

Figure 2:
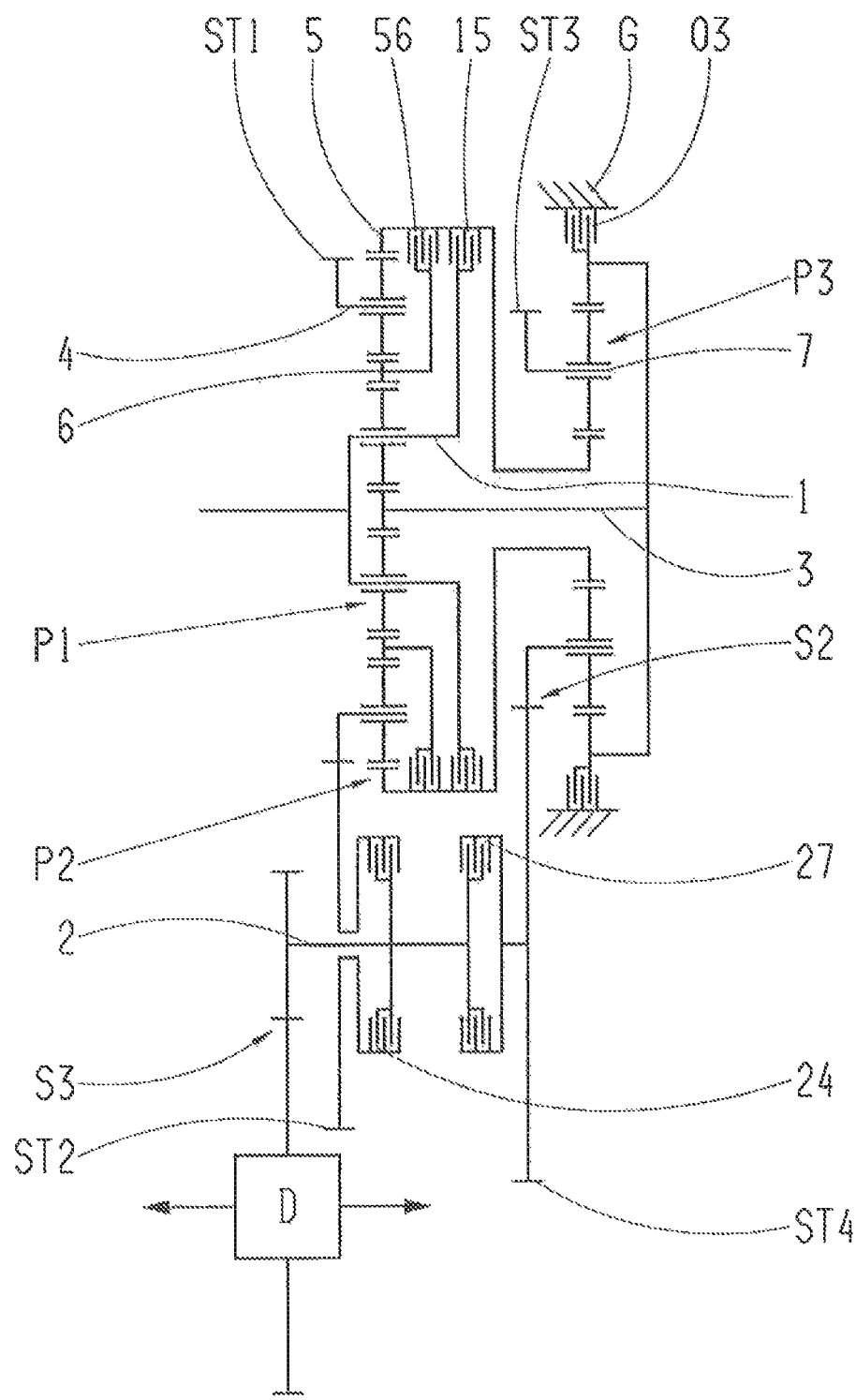
FIG. 2: shows a schematic view of a second preferred embodiment of a multi-stage transmission according to the invention.

Within the scope of another embodiment of the invention, which is the subject of FIG. 2, the additional clutch may be designed as the fifth clutch 56 that detachably connects the sixth shaft 6 to the fifth shaft 5 so that the blocking of the second planetary gear set can occur through a coupling of the ring gear of the second planetary gear set P2 with the sun gear of the second planetary gear set P2. In doing so, the first and the fifth clutch 15, 56 may be arranged next to one another, when viewed axially, and may have a common outer lamellar carrier.

Figure 3:
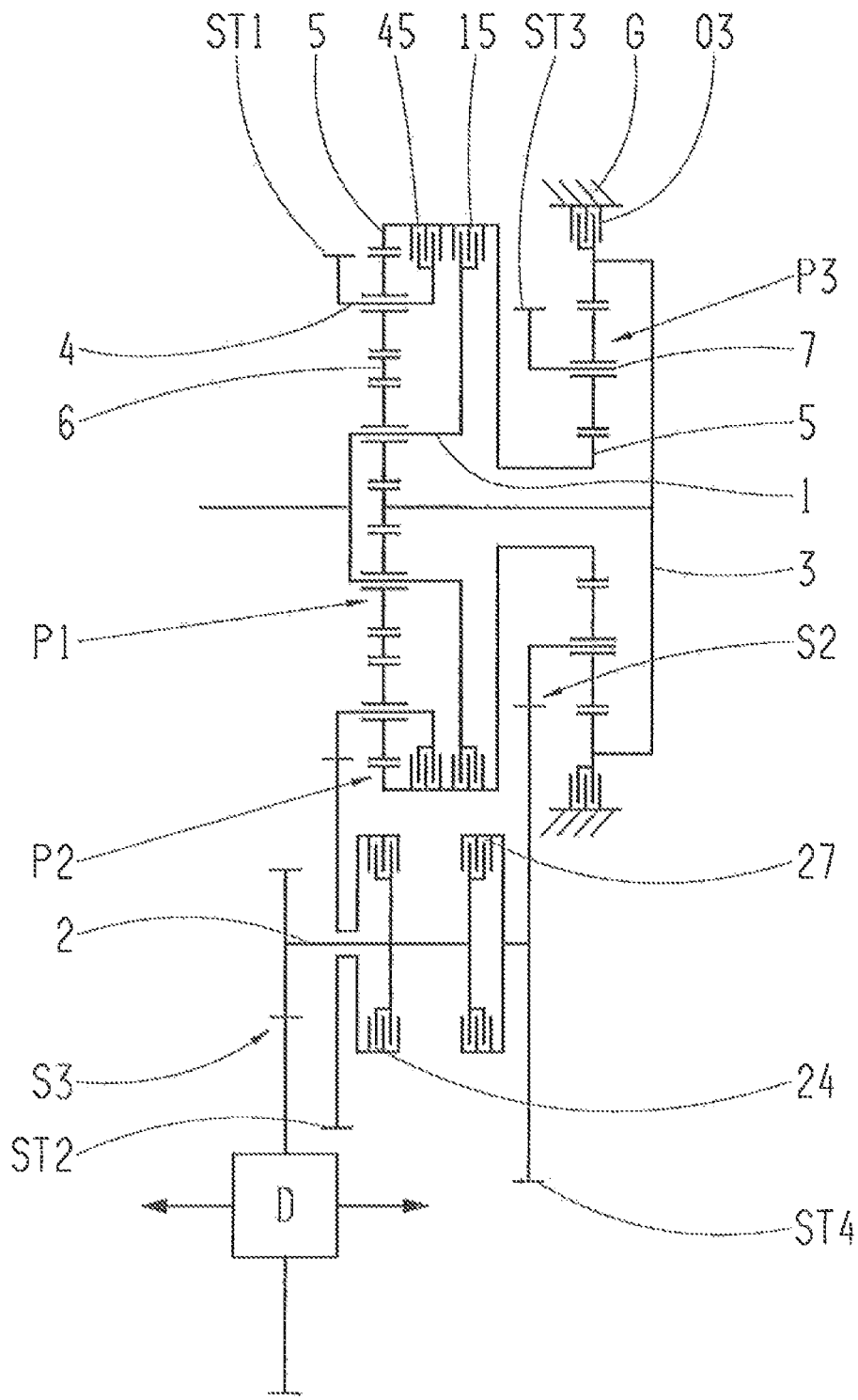
FIG. 3: shows a schematic view of a third preferred embodiment of a multi-stage transmission according to the invention.

With reference to FIG. 3, the additional clutch may be implemented as the sixth clutch 45, which detachably connects the fifth shaft 5 to the fourth shaft 4 so that the blocking of the second planetary gear set can occur through a coupling of the carrier of the second planetary gear set P2 with the ring gear of the second planetary gear set P2. In doing so, the first and the sixth clutch 15, 45 may be arranged next to one another, when viewed axially, and may have a common outer lamellar carrier.

Figure 4:
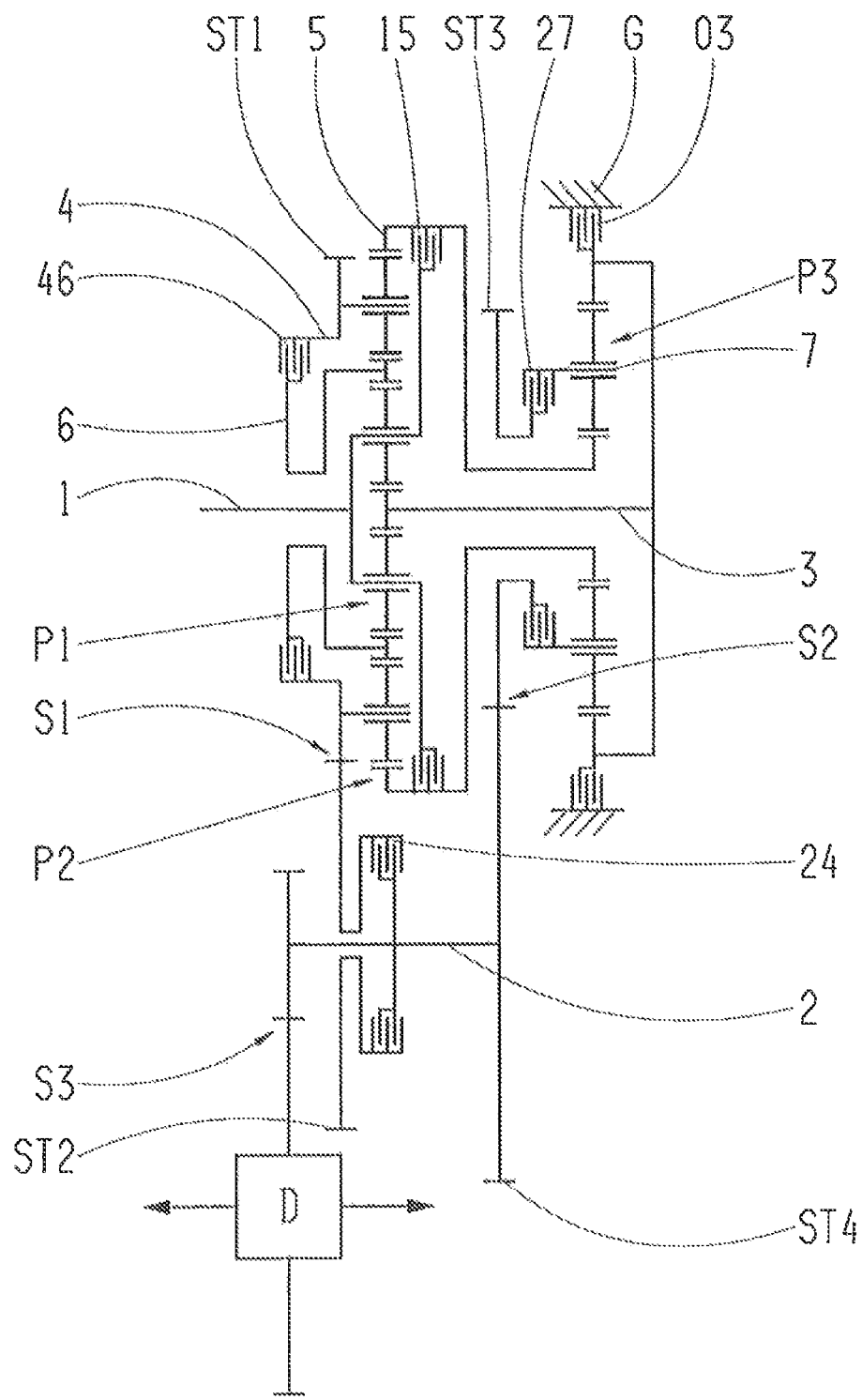
FIG. 4: shows a schematic view of a fourth preferred embodiment of a multi-stage transmission according to the invention.

The transmission shown in FIG. 4 differs from the embodiment according to FIG. 1 in that the seventh shaft 7 may be detachably connected to the first spur gear ST3 of the second spur gear stage S2 via the third clutch 27, in which the second spur gear ST4 of the second spur gear stage S2 is connected to the output shaft 2.

Figure 5:
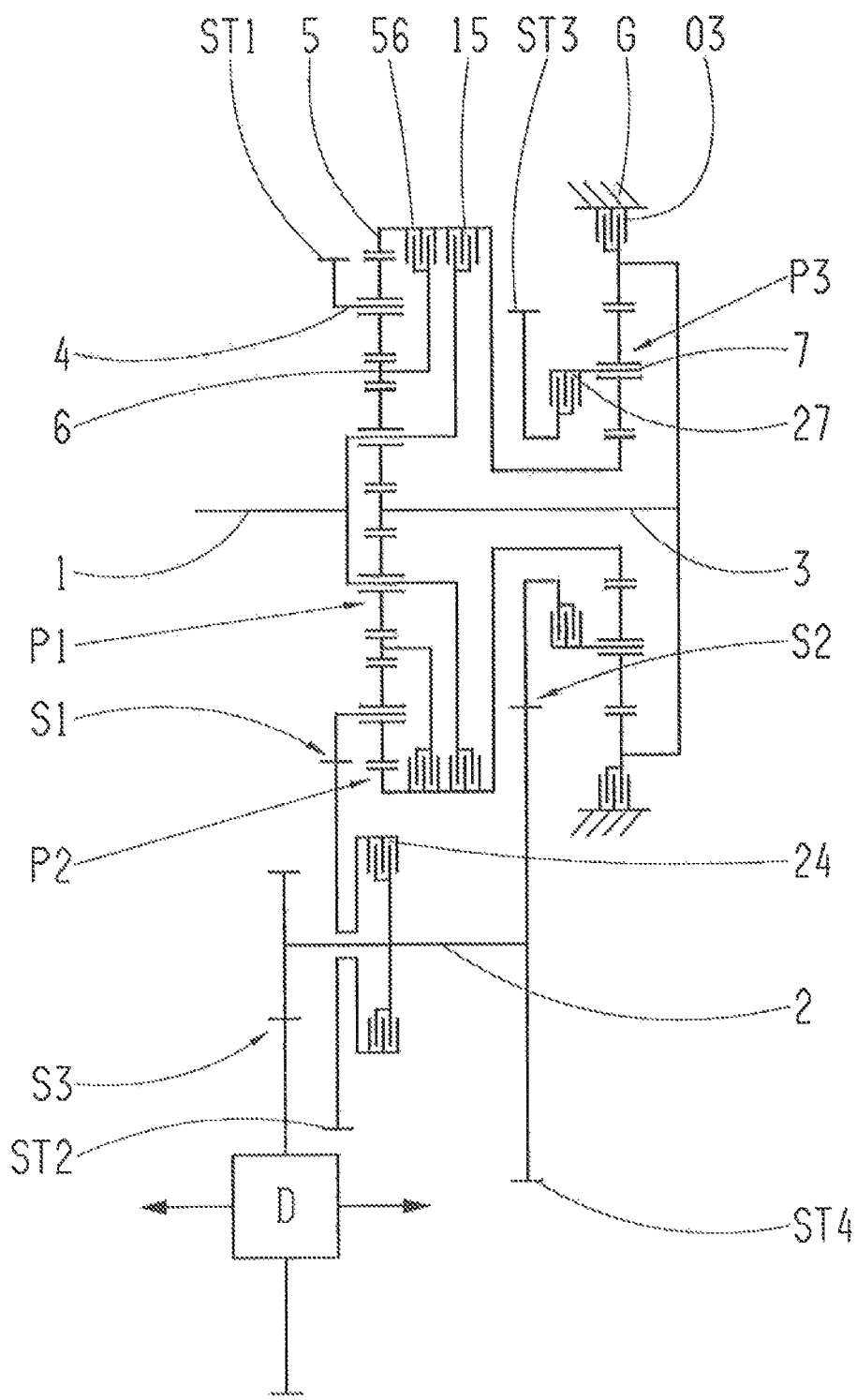
FIG. 5: shows a schematic view of a fifth preferred embodiment of a multi-stage transmission according to the invention.

The subject matter of FIG. 5 is an embodiment that differs from the embodiment according to FIG. 2 in that, similar to the example according to FIG. 4, the seventh shaft 7 may be detachably connected to the first spur gear ST3 of the second spur gear stage S2 via the third clutch 27, in which the second spur gear ST4 of the second spur gear stage S2 is connected to the output shaft 2.

Figure 6:
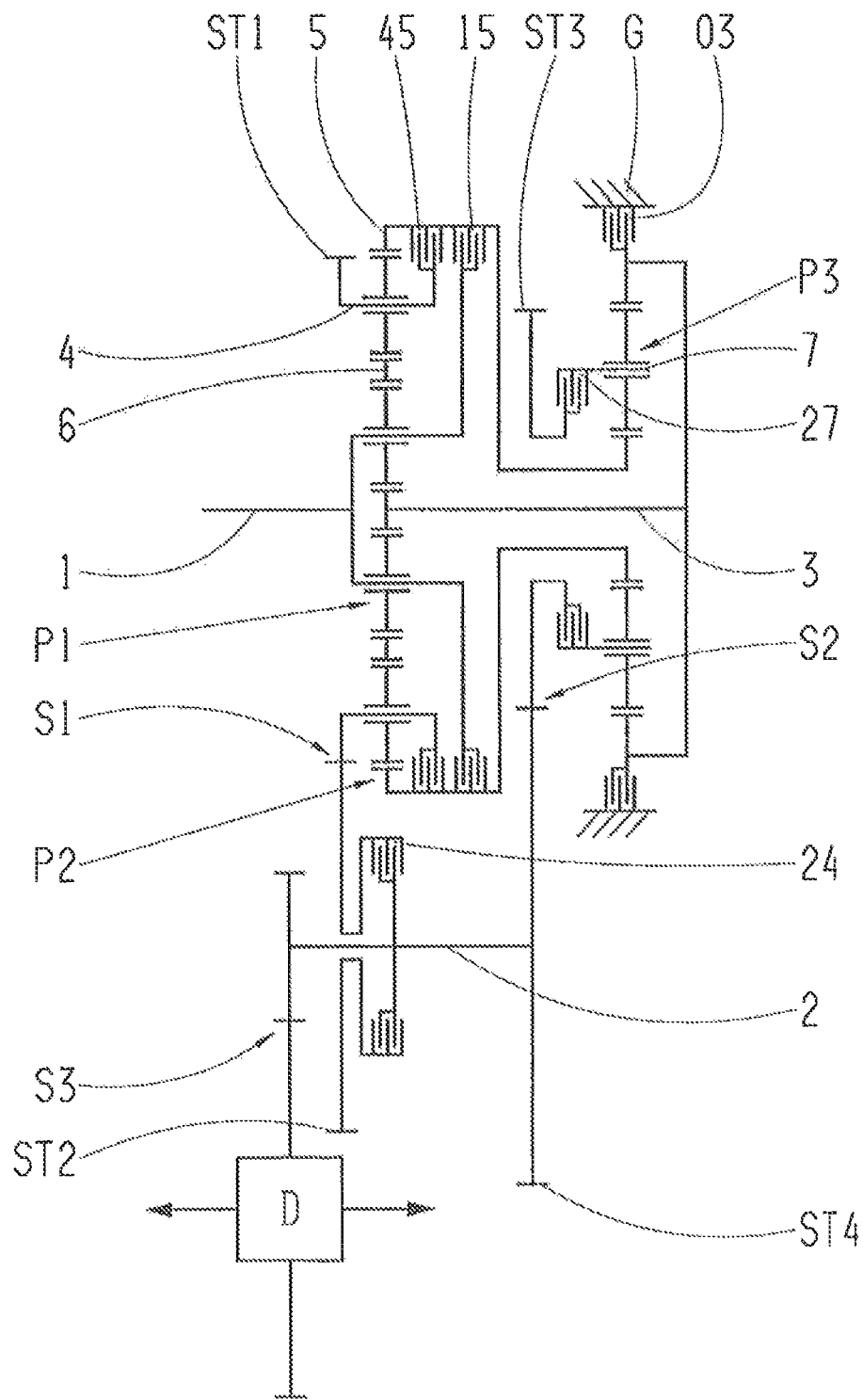
FIG. 6: shows a schematic view of a sixth preferred embodiment of a multi-stage transmission according to the invention.

Furthermore, an embodiment is shown in FIG. 6 that corresponds to the embodiment according to FIG. 3, with the difference that the seventh shaft 7 may be detachably connected to the first spur gear ST3 of the second spur gear stage S2 via the third clutch 27, and that the second spur gear ST4 of the second spur gear stage S2 is connected to the output shaft 2.

According to the invention, the fourth shaft 4 may be detachably connected to the first spur gear ST1 of the first spur gear stage S1 via the second clutch 24, in which the second spur gear ST2 of the first spur gear stage S1 is connected to the output shaft 2.

Figure 7:
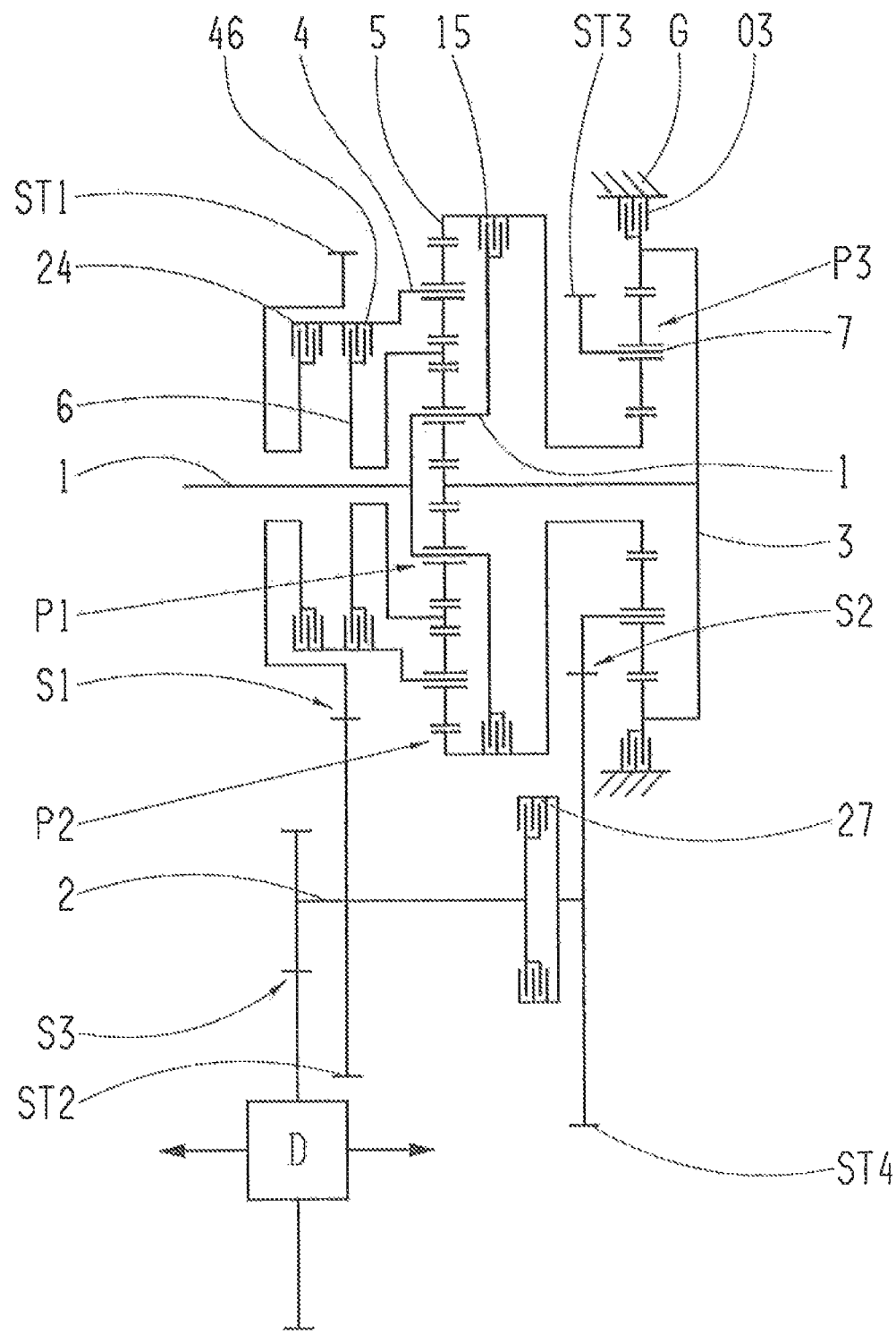
FIG. 7: shows a schematic view of a seventh preferred embodiment of a multi-stage transmission according to the invention.
Figure 8:
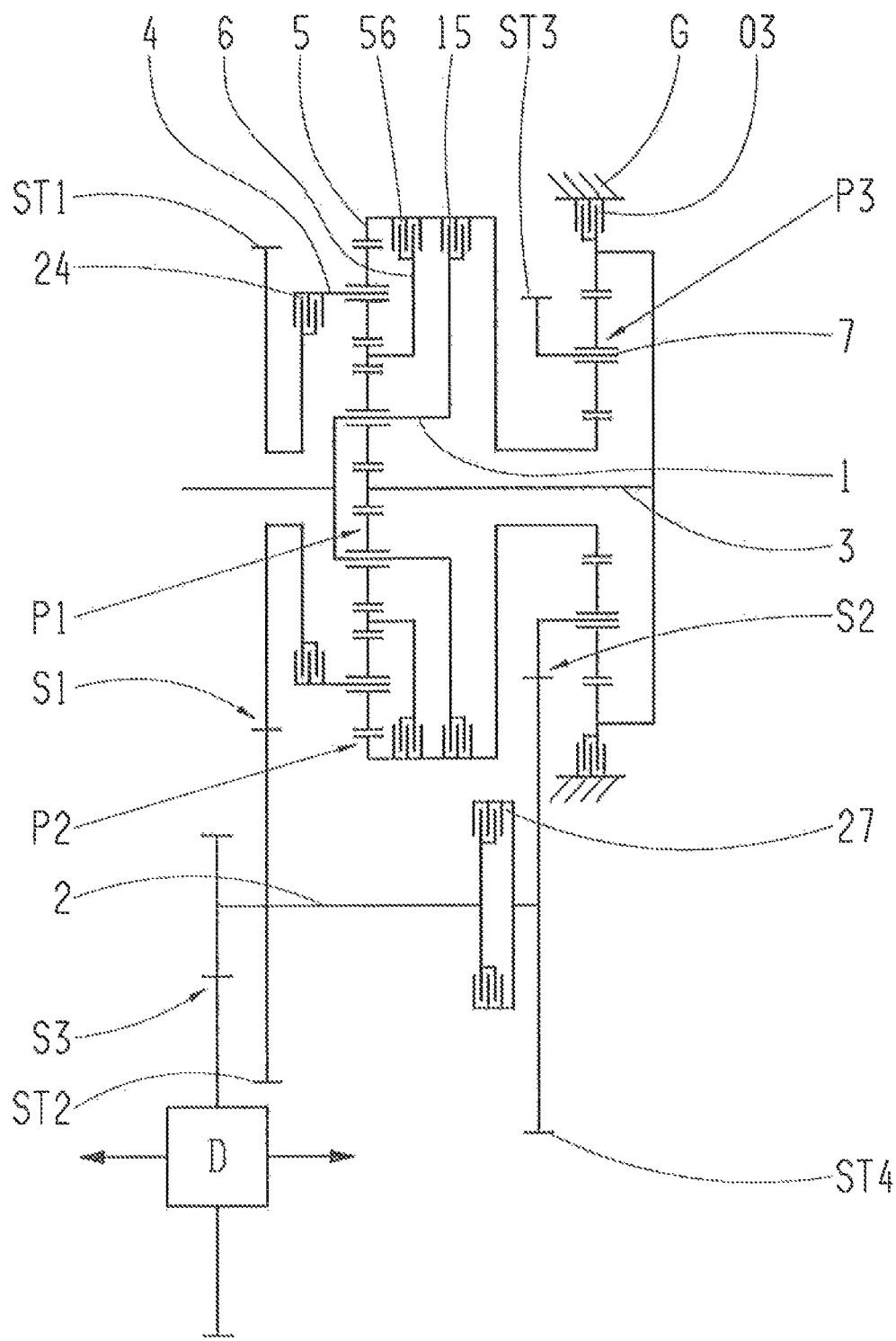
FIG. 8: shows a schematic view of an eighth preferred embodiment of a multi-stage transmission according to the invention.
Figure 9:
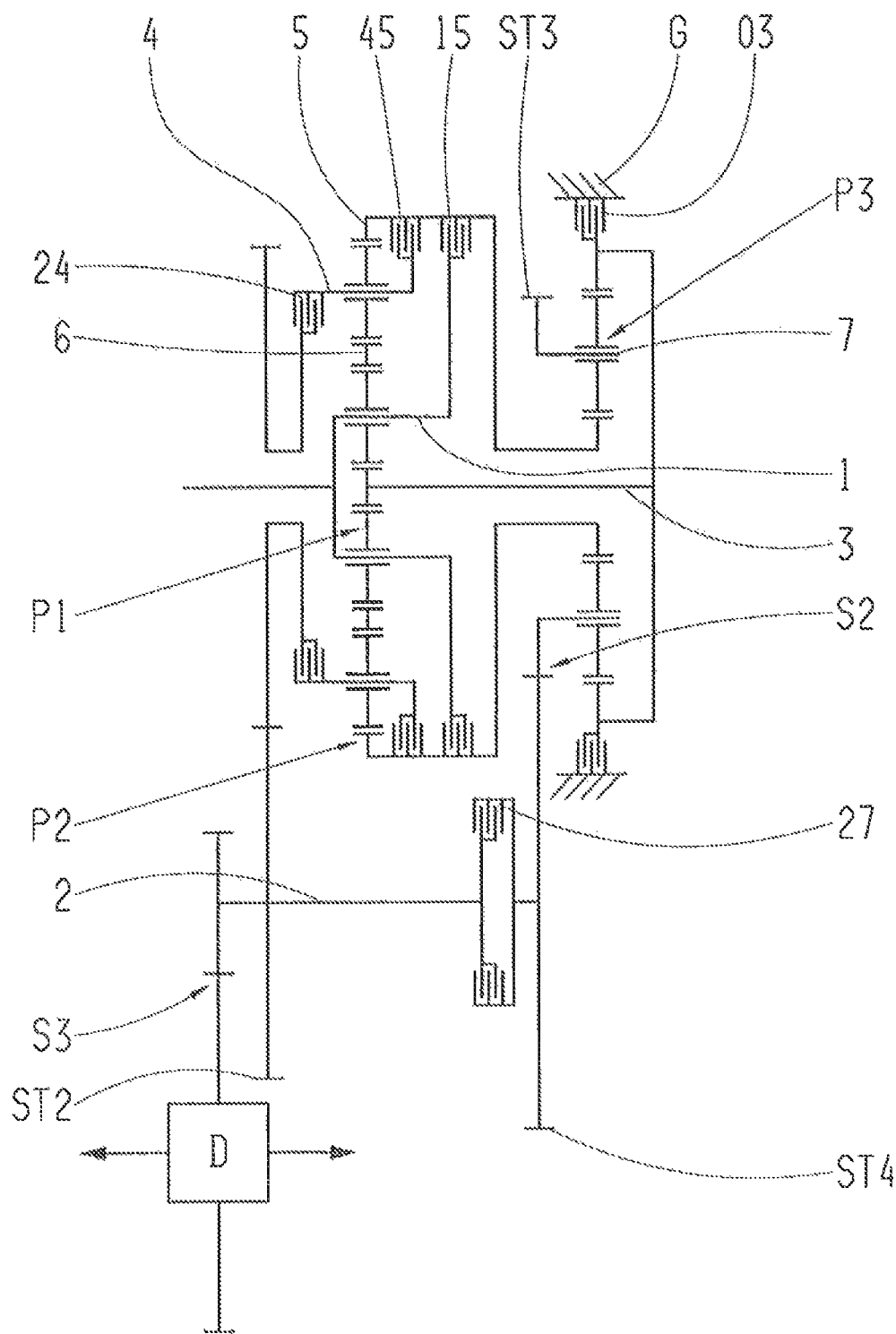
FIG. 9: shows a schematic view of a ninth preferred embodiment of a multi-stage transmission according to the invention.

This embodiment is the subject matter of FIGS. 7, 8, 9, in which the exemplary embodiment according to FIG. 7 corresponds to the exemplary embodiment according to FIG. 1, the exemplary embodiment according to FIG. 8 corresponds to the exemplary embodiment according to FIG. 2, and the exemplary embodiment according to FIG. 9 corresponds to the exemplary embodiment according to FIG. 3 with the difference that the fourth shaft 4 may be detachably connected to the first spur gear ST1 of the first spur gear stage S1 via the second clutch 24, and that the second spur gear ST2 of the first spur gear stage S1 is connected to the output shaft 2.

Furthermore, it is possible, according to a further embodiment of the invention, for the fourth shaft 4 to be detachably connected to the first spur gear ST1 of the first spur gear stage S1 via the second clutch 24, in which the second spur gear ST2 of the first spur gear stage S1 is connected to the output shaft 2 and the seventh shaft 7 may be detachably connected to the first spur gear ST3 of the second spur gear stage S2 via the third clutch 27, in which the second spur gear ST4 of the second spur gear stage 32 is connected to the output shaft 2.

Figure 10:
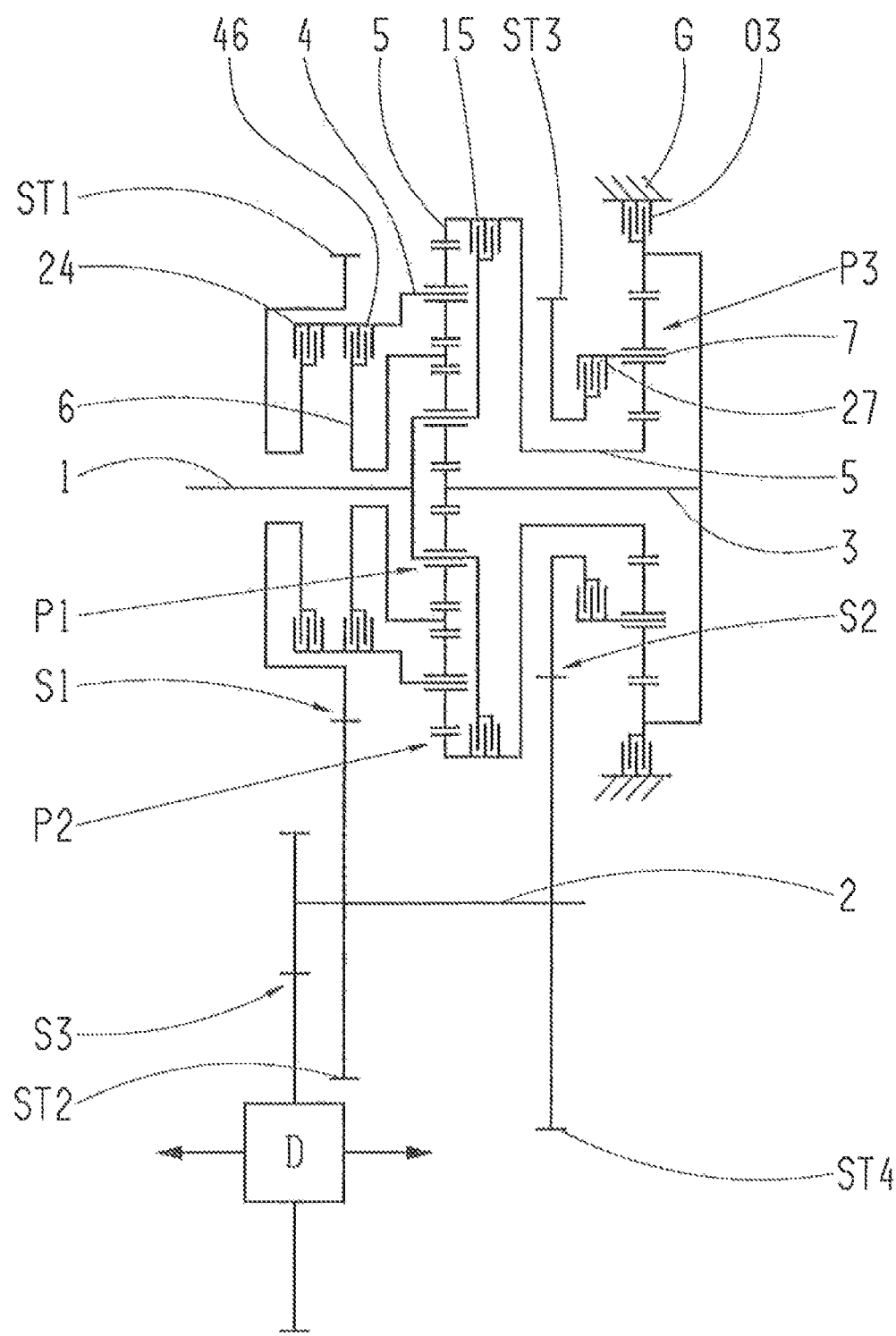
FIG. 10: shows a schematic view of a tenth preferred embodiment of a multi-stage transmission according to the invention.
Figure 11:
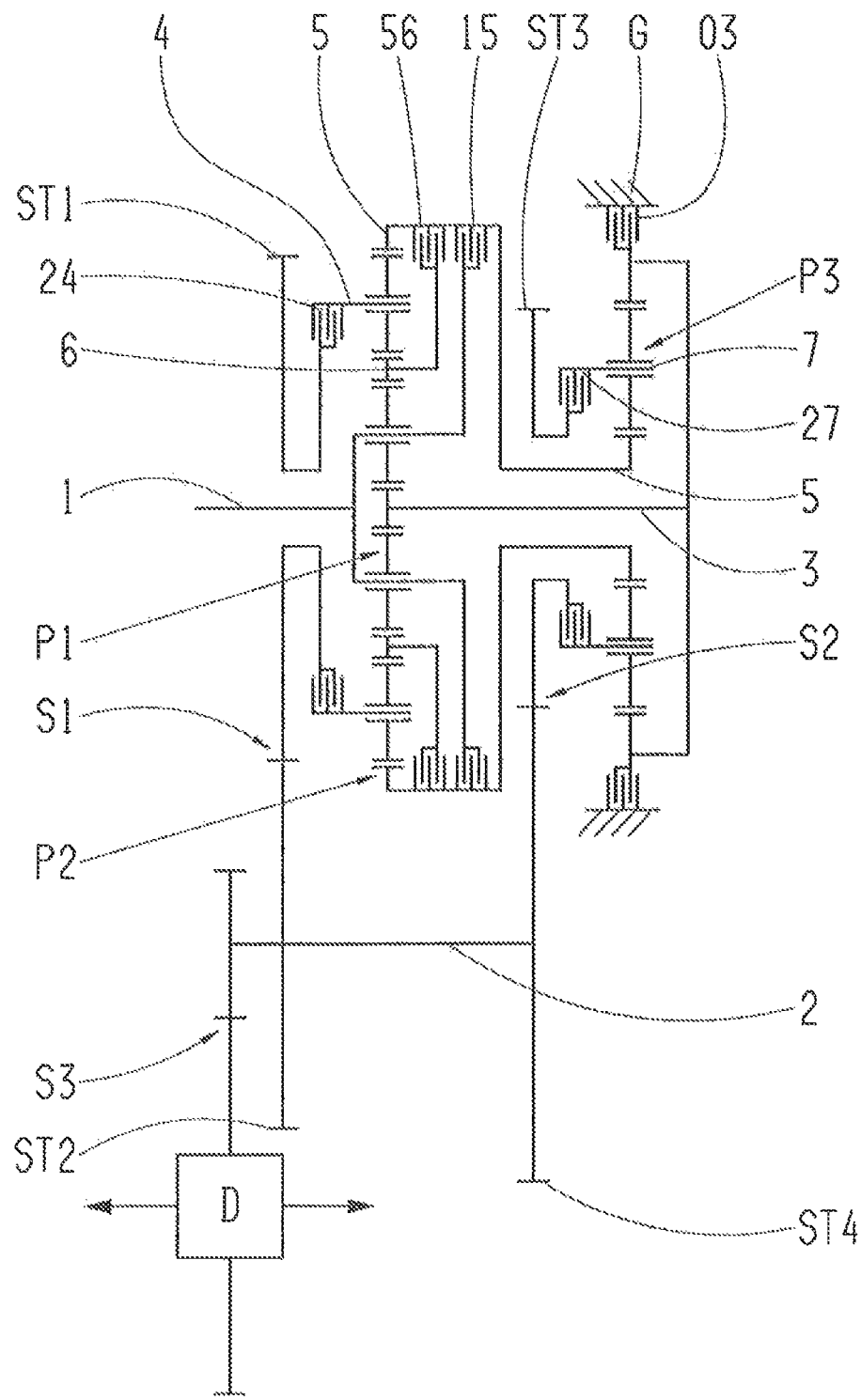
FIG. 11: shows a schematic view of an eleventh preferred embodiment of a multi-stage transmission according to the invention.
Figure 12:
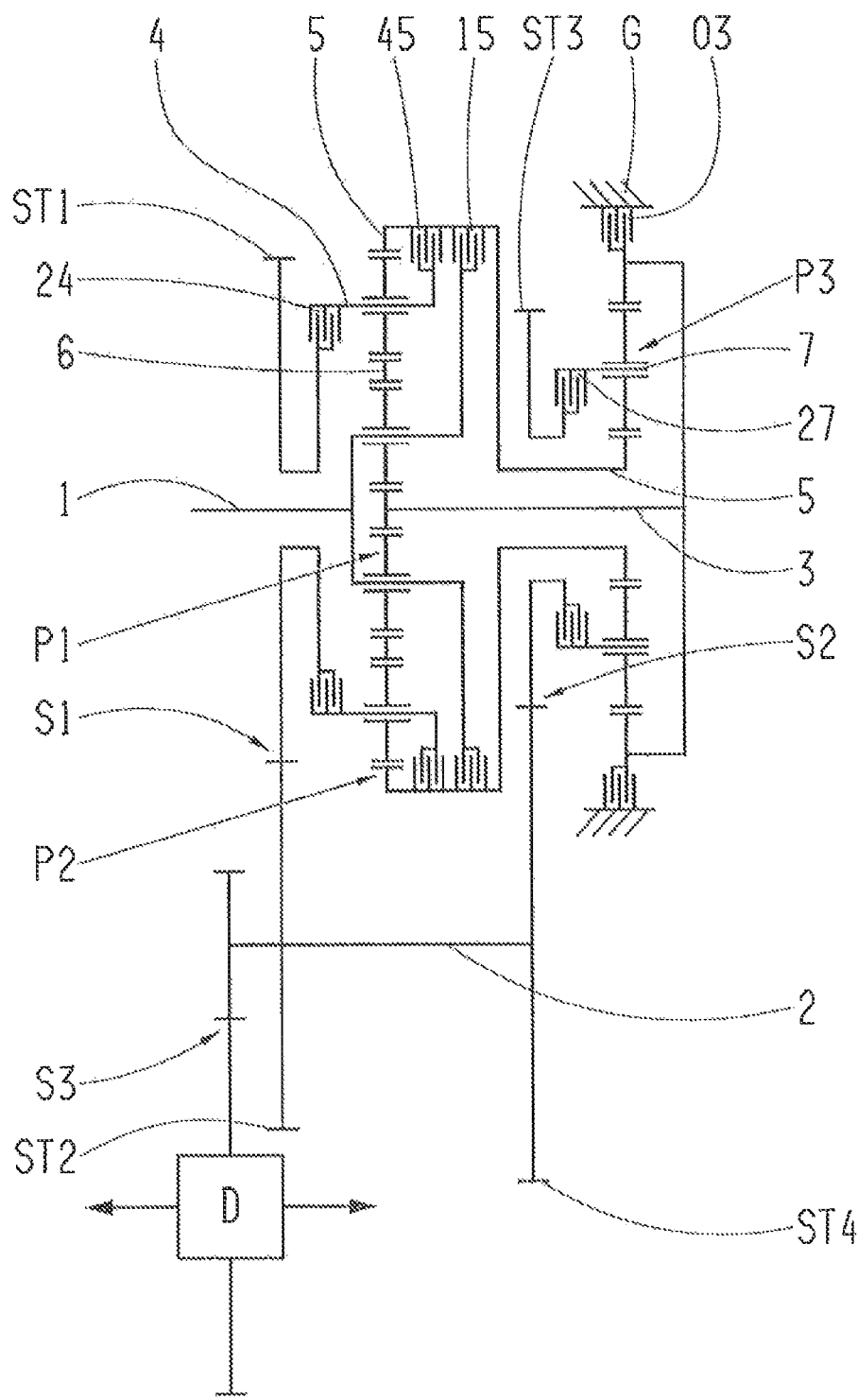
FIG. 12: shows a schematic view of a twelfth preferred embodiment of a multi-stage transmission according to the invention.

FIGS. 10, 11, and 12 show transmissions in which the fourth shaft 4 may be detachably connected to the first spur gear ST1 of the first spur gear stage S1 via the second clutch 24, in which the second spur gear ST2 of the first spur gear stage S1 is connected to the output shaft 2, in which the seventh shaft 7 may be detachably connected to the first spur gear ST3 of the second spur gear stage S2 via the third clutch 27 and the second spur gear ST4 of the second spur gear stage S2 is connected to the output shaft 2. With the exception of the arrangement of the second and third clutch 24, 27, these exemplary embodiments correspond to the exemplary embodiments according to FIGS. 1, 2, and/or 3.

Figure 16:
FIG. 16: an output shaft of the transmission is connected to the input shaft of a differential transmission via at least one planetary gear.

With the exemplary embodiments according to FIGS. 1 through 12, an additional spur gear stage 82 is engaged downstream from the transmission, which is connected to a differential gear D of the vehicle. FIG. 16 diagrammatically shows the output shaft 2 of the transmission is connected to the input shaft of a differential transmission D via at least one planetary gear.

Within the scope of an advantageous further embodiment of the invention, only the second clutch 24 and the third clutch 27 may be implemented as friction shift elements capable of continuous slipping, whereby rotational regularity countermeasures may be omitted.

FIG. 13 shows an exemplary gearshift pattern of a multistage transmission according to FIGS. 1 through 12. Three shifting elements are engaged for each gear. The respective transmission ratios (i) of the individual gears and the resulting gear steps or progressive ratios φ to be determined for the next-higher gear can be seen as an example in the gearshift pattern, in which the value 8.040 represents the transmission ratio spread.

The values for the stationary transmission ratios of planetary gear sets P1, P2, P3 implemented as minus planetary gear sets are −1.720, −1.630, and −1.580, respectively, with the example shown, in which the ratios of the first and the second spur gear stage S1, S2 are 1.000 and 1.970, respectively. FIG. 13 shows that only one shift element must be engaged and one shift element disengaged with the sequential shifting method, because two adjacent gears utilize two shifting elements jointly. Furthermore, it is clear that a large spread is achieved with small gear steps.

In the event that a fourth clutch 46 is provided that detachably connects the fourth shaft 4 to the sixth shaft 6, which is the case with the embodiments according to FIGS. 1, 4, 7, and 10, the first forward gear results from engaging the brake 03 and the first and third clutch 15, 27; the second forward gear results from engaging the brake 03 and the third and fourth clutch 27, 46; the third forward gear results from engaging the first, third, and fourth clutch 15, 27, 46; the fourth forward gear results from engaging the second, third, and fourth clutch 24, 27, 46; the fifth forward gear results from engaging the first, second, and third clutch 15, 24, 27; the sixth forward gear, which is implemented as a direct drive, results from engaging the first, second, and fourth clutch 15, 24, 46; the seventh forward gear results from engaging the brake 03 and the first and second clutch 15, 24; and the eighth forward gear results from engaging the brake 03 and the second and fourth clutch 24, 46; while the reverse gear results from engaging the brake 03 and the second and third clutch 24, 27.

For the embodiments shown in FIGS. 2, 5, 8, and 11, the gearshift pattern differs from the gearshift pattern according to FIG. 13 only in that the fourth clutch 46 is replaced by the fifth clutch 56, in which, in the event of a transmission according to FIGS. 3, 6, 9, and 12, the fourth clutch 46 is replaced by the sixth clutch 45.

By virtue of the fact that the brake 03 and the third clutch 27 are engaged in the first forward gear and in reverse gear, these shift elements may be used as startup elements.

According to the invention, this results in different gear steps with the same gearshift pattern, depending on the shifting logic, which means that an application- or vehicle-specific variation is enabled.

In principle, an electric machine or another drive source can be arranged on any shaft of the transmission according to the invention, Within the scope of a particularly advantageous further embodiment of the invention and with reference to FIG. 5, an electric machine may be provided that is disposed on drive shaft 1.

Figure 14:
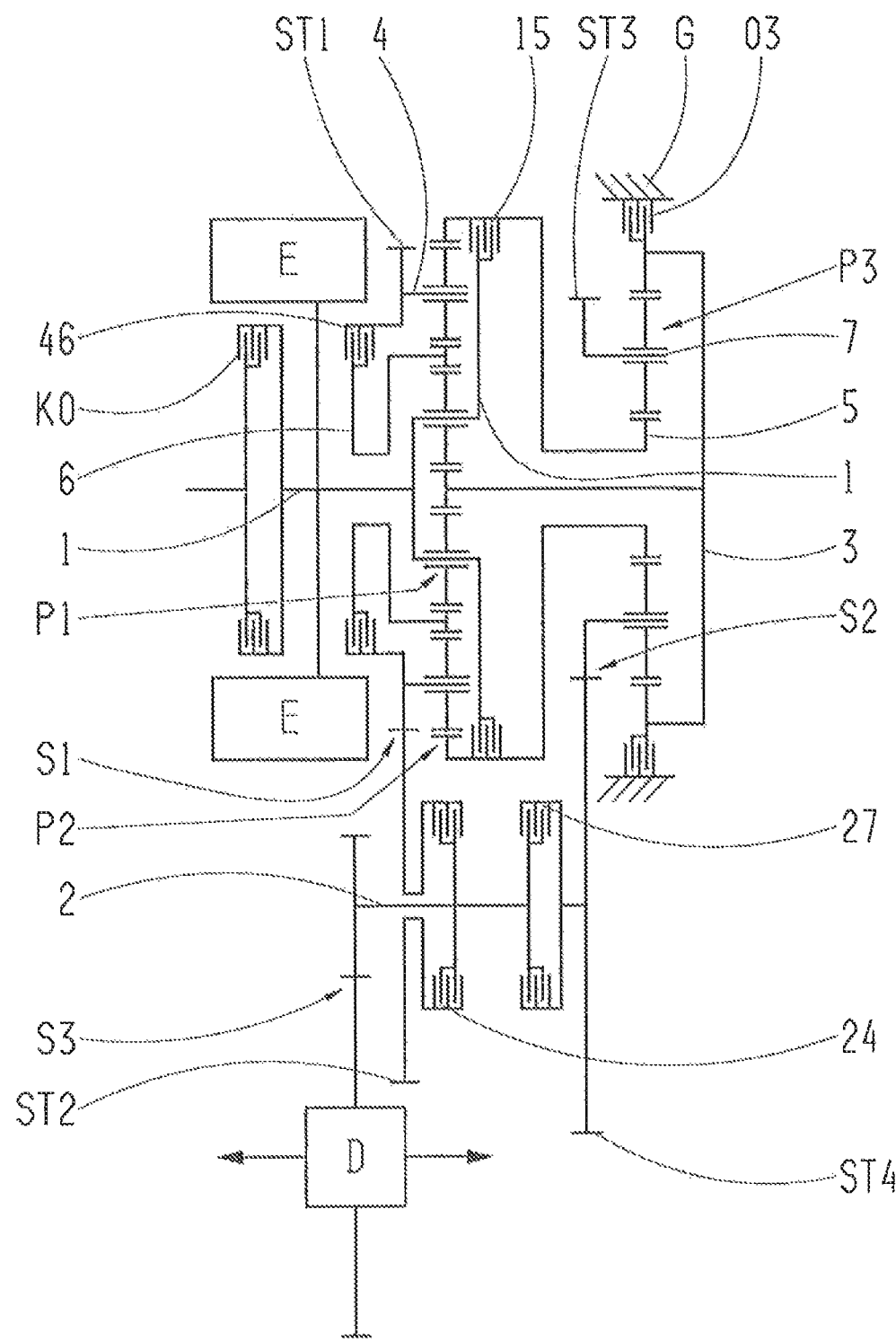
FIG. 14: shows a schematic view of a hybridized multi-stage transmission based on the embodiment according to FIG. 1.

The exemplary embodiment shown in FIG. 14 corresponds to the exemplary embodiment according to FIG. 1 with the difference that an electric machine E is provided that is disposed on the drive shaft 1 of the transmission and is directly connected to the drive shaft 1. With the example shown in FIG. 14, a seventh clutch K0 is provided by means of which the internal combustion engine, which is only diagrammatically shown in FIG. 15, can be decoupled from the transmission, whereby all gears of the transmission can be operated purely electrically.

As an alternative to the direct connection of the electric machine E to the drive shaft 1, the electric machine may be arranged parallel to the axis with respect to the drive shaft 1 and be connected to the drive shaft 1 via a spur gear or a chain drive. This embodiment is the subject matter of FIG. 15. The transmission shown here corresponds to the transmission according to FIG. 1 with the difference that an electric machine E is arranged parallel to the axis with respect to the drive shaft 1 and is connected to the drive shaft 1 via an additional, fourth spur gear stage S4.

Figure 15:
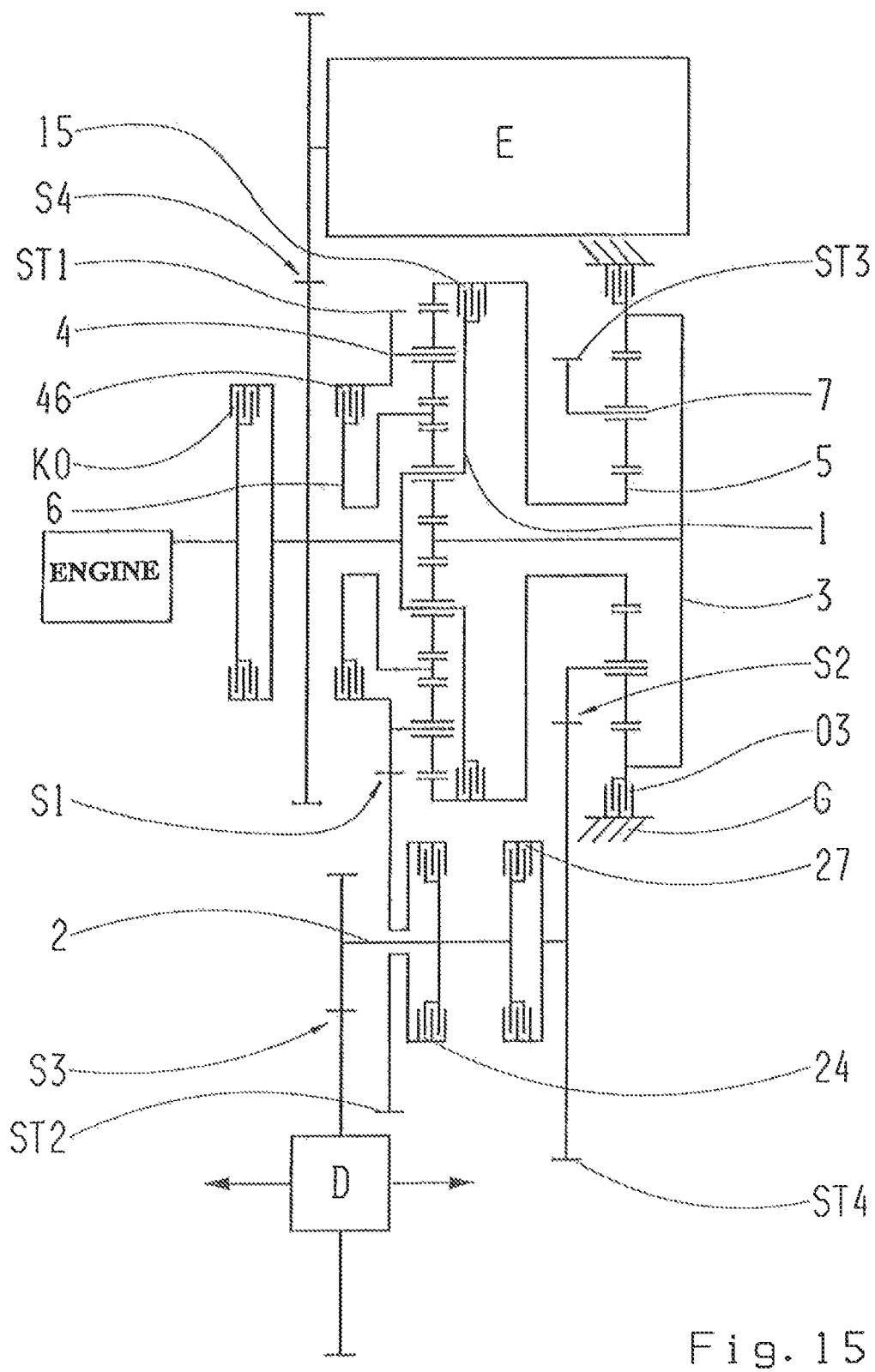
FIG. 15: shows a schematic view of another embodiment of a hybridized multi-stage transmission based on the embodiment according to FIG. 1.

With the example shown in FIG. 15, a seventh clutch K0 is arranged between the combustion engine (only diagrammatically shown) and the drive shaft 1, similar to the example according to FIG. 14, in order to enable purely electric driving. Instead of the spur gear stage S4, other suitable means may be used, such as, for example, a chain drive.

Similar to the examples according to FIG. 14 and FIG. 15, the other embodiments according to the invention in FIGS. 2 through 12 may also be hybridized.

According to the invention, it is possible to provide additional freewheels on any suitable site of the multi-stage transmission, for example between a shaft and the housing or optionally to connect two shafts.

According to the invention, an axle differential and/or distributor differential may be disposed on the drive side or on the output side.

Within the scope of advantageous further embodiments, the drive shaft 1 may be separated from a drive motor by a clutch element as needed, in which a hydrodynamic converter, a hydraulic clutch, a dry startup clutch, a wet startup clutch, a magnetic particle clutch, or a centrifugal clutch may be used as the clutch element. It is also possible to arrange such type of startup element in the direction of force application, behind the transmission, in which, in this case, the drive shaft 1 is permanently connected to the crankshaft of the drive motor.

The multi-stage transmission according to the invention additionally enables the placement of a torsion vibration damper between the drive motor and the transmission.

Within the scope of an additional embodiment of the invention, which is not shown, a non-wearing brake may be placed on any shaft, preferably on drive shaft 1 or drive shaft 2, such as, for example, a hydraulic or electric retarder or the like, which is of particular importance especially for use in commercial vehicles. Furthermore, an auxiliary drive may be provided on any shaft, preferably on drive shaft 1 or drive shaft 2, in order to drive additional units.

The friction shift elements used may be implemented as power shift clutches or brakes. In particular, friction clutches or brakes, such as, for example, disc clutches, band brakes, and/or cone clutches, may be used. Furthermore, the shift elements used may be implemented as friction shift elements.

REFERENCE CHARACTERS 1 first shaft, drive shaft
2 second shaft, output shaft
3 third shaft
4 fourth shaft
5 fifth shaft
6 sixth shaft
7 seventh shaft
03 brake
15 first clutch
24 second clutch
27 third clutch
45 sixth clutch
46 fourth clutch
56 fifth clutch
D differential transmission
E electric machine
G housing
K0 seventh clutch
P1 first planetary gear set
P2 second planetary gear set
P3 third planetary gear set
S1 first spur gear stage
S2 second spur gear stage
S3 third spur gear stage
S4 fourth spur gear stage
ST1 first spur gear of the first spur gear stage S1
ST2 second spur gear of the first spur gear stage S1
ST3 first spur gear of the second spur gear stage S2
ST4 second spur gear of the second spur gear stage S2
i transmission ratio
φ progressive ratio

The invention claimed is:

1. A multi-stage automatic transmission for a motor vehicle, the transmission comprising:
an input shaft (1) and an output shaft (2);
first, second and third planetary gear sets (P1, P2, P3), each of the first, the second and the third planetary gear sets comprising a sun gear, a ring gear and a carrier;
first and second spur gear stages (S1, S2) being connected to a countershaft, disposed parallel to a longitudinal axis of the first, the second and the third planetary gear sets (P1, P2, P3), and serving as the output shaft (2) of the transmission, the first and second spur gear stages (S1, S2) being disposed inside a housing (G);
at least third, fourth, fifth, sixth and seventh rotatable shafts (3, 4, 5, 6, 7);
at least five shift elements (03, 15, 24, 27, 45, 46, 56) comprising a brake (03) and first, second, third and fourth clutches (15, 24, 27, 45, 46, 56) whose selective engagement results in different transmission ratios between the input shaft (1) and the output shaft (2) so that eight forward gears and one reverse gear are implementable;
the input shaft (1) being connected to the carrier of the first planetary gear set (P1), the input shaft (1) being detachably connected to the fifth shaft (5) via the first clutch (15), and the fifth shaft (5) being directly connected to the ring gear of the second planetary gear set (P2) and the sun gear of the third planetary gear set (P3);
the ring gear of the first planetary gear set (P1) being connected to the sixth shaft (6) which is also connected to the sun gear of the second planetary gear set (P2);
the third shaft (3) being directly connected to the sun gear of the first planetary gear set (P1) and to the ring gear of the third planetary gear set (P3) and being connectable to the housing (G) of the transmission, via the brake (03);
the carrier of the second planetary gear set (P2) being connected to the fourth shaft (4), and the fourth shaft (4) being detachably connected to the output shaft (2) via the first spur gear stage (S1) and the second clutch (24);
the carrier of the third planetary gear set (P3) being connected to the seventh shaft (7), and the seventh shaft (7) being detachably connected to the output shaft (2) via the second spur gear stage (S2) and the third clutch (27); and
the fourth clutch (46, 56, 45) being engagable for blocking the second planetary gear set (P2).

2. The multi-stage transmission according to claim 1, wherein the fourth clutch (46) detachably connects the sixth shaft (6) to the fourth shaft (4) such that, when the fourth clutch (46) is engaged, the second planetary gear set (P2) is blocked due to coupling of the carrier of the second planetary gear set (P2) with the sun gear of the second planetary gear set (P2).

3. The multi-stage transmission according to claim 1, wherein the fifth clutch (56) detachably connects the fifth shaft (5) with the sixth shaft (6) such that, when the fifth clutch (56) is engaged, the second planetary gear set (P2) is blocked due to coupling of the sun gear of the second planetary gear set (P2) with the ring gear of the second planetary gear set (P2).

4. The multi-stage transmission according to claim 1, wherein the sixth clutch (45) detachably connects the fifth shaft (5) with the fourth shaft (4) such that, when the sixth clutch (45) is engaged, the second planetary gear set (P2) is blocked due to coupling of the carrier of the second planetary gear set (P2) with the ring gear of the second planetary gear set (P2).

5. The multi-stage transmission according to claim 1, wherein the fourth shaft (4) is connected to a first spur gear (ST1) of the first spur gear stage (S1), and a second spur gear (ST2) of the first spur gear stage (S1) is detachably connectable to the output shaft (2) via the second clutch (24).

6. The multi-stage transmission according to claim 1, wherein the fourth shaft (4) is detachably connectable to the first spur gear (ST1) of the first spur gear stage (S1) via the second clutch (24), and the second spur gear (ST2) of the first spur gear stage (S1) is connected to the output shaft (2).

7. The multi-stage transmission according to claim 1, wherein the seventh shaft (7) is connected to a first spur gear (ST3) of the second spur gear stage (S2) and a second spur gear (ST4) of the second spur gear stage (S2) is detachably connectable to the output shaft (2) via the third clutch (27).

8. The multi-stage transmission according to claim 1, wherein the seventh shaft (7) is detachably connected to the first spur gear (ST3) of the second spur gear stage (32) via the third clutch (27), and the second spur gear (ST4) of the second spur gear stage (S2) is connected to the output shaft (2).

9. The multi-stage transmission according to claim 1, wherein the first, the second and the third planetary gear sets (P1, P2, P3) are implemented as minus planetary gear sets.

10. The multi-stage transmission according to claim 1, wherein the second planetary gear set (P2) is arranged about the first planetary gear set (P1), when viewed radially.

11. The multi-stage transmission according to claim 10, wherein the first, the second and the third planetary gear sets (P1, P2, P3) are arranged in a sequence, when viewed axially, of both the first planetary gear set (P1) and the second planetary gear set (P2), and then the third planetary gear set (P3).

12. The multi-stage transmission according to claim 1, wherein an electric machine (E) is either disposed on the input shaft (1) of the transmission and is directly connected to the input shaft (1) or is disposed parallel to the longitudinal axis with respect to the input shaft (1) and is connected to the input shaft (1) via either a spur gear (S4) or a chain drive.

13. The multi-stage transmission according to claim 12, wherein a seventh clutch (K0) is provided by which an internal combustion engine is decouplable from the transmission, whereby all gears of the transmission can be operated purely electrically.

14. The multi-stage transmission according to claim 1, wherein the fourth clutch (46) detachably connects the fourth shaft (4) to the sixth shaft (6),
  a first forward gear is implemented by engagement of the brake (03) and the first and the third clutches (15, 27);
  a second forward gear is implemented by engagement of the brake (03) and the third and the fourth clutches (27, 46);
  a third forward gear is implemented by engagement of the first, the third, and the fourth clutches (15, 27, 46);
  a fourth forward gear is implemented by engagement of the second, the third, and the fourth clutches (24, 27, 46);
  a fifth forward gear is implemented by engagement of the first, the second, and the third clutches (15, 24, 27);
  a sixth forward gear is implemented by engagement of the first, the second, and the fourth clutches (15, 24, 46);
  a seventh forward gear is implemented by engagement of the brake (03) and the first and the second clutches (15, 24);
  an eighth forward gear is implemented by engagement of the brake (03) and the second and the fourth clutches (24, 46); and
  the reverse gear is implemented by engagement of the brake (03) and the second and the third clutches (24, 27).

15. The multi-stage transmission according to claim 1, wherein, wherein the fourth clutch (56) detachably connects the sixth shaft (6) with the fifth shaft (5),
  a first forward gear is implemented by engagement of the brake (03) and the first and the third clutches (15, 27);
  a second forward gear is implemented by engagement of the brake (03) and the third and the fourth clutches (27, 46);
  a third forward gear is implemented by engagement of the first, the third, and the fourth clutches (15, 27, 46);
  a fourth forward gear is implemented by engagement of the second, the third, and the fourth clutches (24, 27, 46);
  a fifth forward gear is implemented by engagement of the first, the second, and the third clutches (15, 24, 27);
  a sixth forward gear is implemented by engagement of the first, the second, and the fourth clutches (15, 24, 46);
  a seventh forward gear is implemented by engagement of the brake (03) and the first and the second clutches (15, 24);
  an eighth forward gear is implemented by engagement of the brake (03) and the second and the fourth clutches (24, 46); and
  the reverse gear is implemented by engagement of the brake (03) and the second and the third clutches (24, 27).

16. The multi-stage transmission according to claim 1, wherein the fourth clutch (45) detachably connects the fifth shaft (5) with the fourth shaft (4),
  a first forward gear is implemented by engagement of the brake (03) and the first and the third clutches (15, 27);
  a second forward gear is implemented by engagement of the brake (03) and the third and the fourth clutches (27, 46);
  a third forward gear is implemented by engagement of the first, the third, and the fourth clutches (15, 27, 46);
  a fourth forward gear is implemented by engagement of the second, the third, and the fourth clutches (24, 27, 46);
  a fifth forward gear is implemented by engagement of the first, the second, and the third clutches (15, 24, 27);
  a sixth forward gear is implemented by engagement of the first, the second, and the fourth clutches (15, 24, 46);
  a seventh forward gear is implemented by engagement of the brake (03) and the first and the second clutches (15, 24);
  an eighth forward gear is implemented by engagement of the brake (03) and the second and the fourth clutches (24, 46); and
  the reverse gear is implemented by engagement of the brake (03) and the second and the third clutches (24, 27).

17. The multi-stage transmission according to claim 1, wherein either instead of or in addition to at least one of the first and the second spur gear stage, at least one of a mechanical component, a belt and a chain are arranged for transmitting torque.

18. The multi-stage transmission according to claim 1, wherein the output shaft (2) is connected to an input shaft of a differential transmission via at least one planetary gear.

19. A multi-stage automatic transmission for a motor vehicle, the transmission comprising:
  an input shaft (1) and an output shaft (2);
  first, second and third planetary gear sets (P1, P2, P3), each of the first, the second and the third planetary gear sets comprises a sun gear, a ring gear and a carrier;
  first and second spur gear stages (S1, S2) connected to a countershaft, which is disposed parallel to a longitudinal axis of the first, the second and the third planetary gear sets (P1, P2, P3) and serves as the output shaft (2) of the transmission, which are disposed inside a housing (G);
  at least third, fourth, fifth, sixth, seventh and eighth rotatable shafts (3, 4, 7, 8);
  at least five shift elements (03, 15, 24, 27, 45, 46, 56), comprising a brake (03) and first, second, third and fourth clutches (15, 24, 27, 45, 46, 56), selective engagement of the at least five shift elements results in different transmission ratios between the input shaft (1) and the output shaft (2) such that eight forward gears and one reverse gear can be implemented;
  the input shaft (1) is continuously connected to the carrier of the first planetary gear set (P1) and is connectable, via the first clutch (15), to the fifth shaft (5);
  the third shaft (3) is continuously connected to the sun gear of the first planetary gear set (P1) and the ring gear of the third planetary gear set (P3) and is connectable, via the brake (03), to the housing (G) of the transmission;

the fourth shaft (4) is continuously connected to the carrier of the second planetary gear set (P2) is connectable to the output shaft (2) via the first spur gear stage (S1) and the second clutch (24);

the fifth shaft (5) is continuously connected to the ring gear of the second planetary gear set (P2) and the sun gear of the third planetary gear set (P3);

the sixth shaft (6) is continuously connected to the ring gear of the first planetary gear set (P1) and the sun gear of the second planetary gear set (P2);

the seventh shaft (7) is continuously connected to the carrier of the third planetary gear set (P3) and is connectable to the output shaft (2) via the second spur gear stage (S2) and the third clutch (27);

the fourth clutch (46, 56, 45) is engagable to block the second planetary gear set (P2).

20. The multi-stage transmission according to claim 19, wherein a first forward gear is implemented by engagement of the brake (03) and the first and the third clutches (15, 27);

a second forward gear is implemented by engagement of the brake (03) and the third and the fourth clutches (27, 46);

a third forward gear is implemented by engagement of the first, the third, and the fourth clutches (15, 27, 46);

a fourth forward gear is implemented by engagement of the second, the third, and the fourth clutches (24, 27, 46);

a fifth forward gear is implemented by engagement of the first, the second, and the third clutches (15, 24, 27);

a sixth forward gear is implemented by engagement of the first, the second, and the fourth clutches (15, 24, 46);

a seventh forward gear is implemented by engagement of the brake (03) and the first and the second clutches (15, 24);

an eighth forward gear is implemented by engagement of the brake (03) and the second and the fourth clutches (24, 46); and the reverse gear is implemented by engagement of the brake (03) and the second and the third clutches (24, 27).

\* \* \* \* \*